United States Patent [19]

Iglehart et al.

[11] Patent Number: 5,485,511
[45] Date of Patent: Jan. 16, 1996

[54] METHOD AND APPARATUS FOR DETERMINING THE TELEPHONY FEATURES ASSIGNED TO A TELEPHONE

[75] Inventors: David Iglehart, Austin; Robert D. Whittington; Elie A. Jreij, both of Pflugerville; Andrzej Koscinski; Leland Lester, both of Austin, all of Tex.

[73] Assignee: Siemens Rolm Communications Inc., Santa Clara, Calif.

[21] Appl. No.: 303,100

[22] Filed: Sep. 8, 1994

[51] Int. Cl.[6] .................................................. H04M 3/42
[52] U.S. Cl. ........................ 379/201; 379/156; 379/157
[58] Field of Search ............................ 379/88, 89, 142, 379/201, 207, 211, 212, 265, 266, 156, 157

[56] References Cited

U.S. PATENT DOCUMENTS

| | | | |
|---|---|---|---|
| 4,759,056 | 7/1988 | Akiyama | 379/142 |
| 5,012,511 | 4/1991 | Hanle et al. | 379/211 |
| 5,222,125 | 6/1993 | Creswell et al. | 379/201 |
| 5,355,404 | 10/1994 | LeDuc et al. | 379/201 |
| 5,377,261 | 12/1994 | Baals et al. | 379/201 |
| 5,404,396 | 4/1995 | Brennan | 379/201 |

*Primary Examiner*—Jeffery A. Hofsass
*Assistant Examiner*—Scott Wolinsky

[57] ABSTRACT

Method and apparatus for determining the telephony features assigned to a telephone connected to a central switch. By communicating with the central switch, the telephone generates a list of assigned telephony features. The list of telephony features is stored in a nonvolatile memory and displayed to the telephone user.

13 Claims, 3 Drawing Sheets

5,485,511

METHOD AND APPARATUS FOR DETERMINING THE TELEPHONY FEATURES ASSIGNED TO A TELEPHONE

TECHNICAL FIELD OF THE INVENTION

The present invention pertains to method and apparatus for determining the telephony features assigned to a telephone and, in particular, to method and apparatus for generating and displaying a list of telephony features assigned to a telephone connected to a public switch.

BACKGROUND OF THE INVENTION

A telephone ordinarily communicates with other telephones in a telephone network through a central switch, such as the switching system of a telephone company central office. Communication with the central switch ordinarily is accomplished using a conventional protocol, such as an industry standard ISDN protocol.

In most common telephone networks, a variety of special features are available to users in addition to the basic communication of voice and/or other data signals. For example, many public telephone companies offer their users features such as conference, hold, transfer, voice messaging, centrex, call forwarding on busy, call forwarding on idle, selective call forwarding and discounted calling plans for specific geographical regions. Telephone users commonly activate selected features by pressing predetermined keys or sequences of keys on their telephones.

Each telephone in a telephone network commonly has a set of special features assigned to it. Ordinarily, the set of special features assigned to a telephone corresponds to a "class of service" for that telephone. Some common protocols used in telephone networks provide for class of service information to be automatically downloaded to each telephone in the network upon installation of the telephone. Other standard protocols, however, do not provide for downloading class of service (COS) information to telephones. Examples of protocols that do not provide such downloading are the National ISDN 1 Protocol (NI1) and the European Telecommunications Standards Institute ISDN Protocol (ETSI; EURO-ISDN), Where the protocol does not provide for downloading class of service information to each telephone, telephone users generally must determine which telephony features are assigned to their telephone in some inefficient manner. For example, a user may call the telephone company and request a list of features assigned to his telephone. A company service representative then generally looks up a "terminal service profile" for that telephone that specifies the features assigned to the telephone, and mails the information to the user. This technique is undesirable in that it requires the assistance of telephone company personnel and there can be a substantial delay between the request for a list of features and delivery of the list by the telephone company.

Alternatively, a user who has a general list of telephony features offered through his public switch may determine which features are specifically available to his telephone by trying each possible feature. The user can then keep a list of the features that were found to be operative. This technique is undesirable in that it requires the user to test each possible feature and document the results.

In addition to the above-mentioned disadvantages, each of these prior art techniques is inherently inefficient, time consuming, and likely to result in errors of transcription. A further disadvantage is that the telephone user is required to maintain a list of the features available to the telephone. Occasional users of the telephone may not have access to the list of features and will be left without a convenient means of determining which features are available to the telephone. In order to determine whether any change has been made in the features available to a telephone, the user must update the list, either by obtaining new information from the telephone company or by trial and error. Finally, after determining that a feature is available by examining the list of features, a user seeking to activate the feature must determine which keys or sequences of keys must be pressed to activate the feature, which may result in further delay if such information is not readily available to the user or if the user is unfamiliar with the keys on the particular telephone being used.

As a result of the above, there is a need for method and apparatus for enabling users of a telephone to efficiently determine which telephony features are assigned to the telephone, and a further need for efficient means for activating selected features assigned to the telephone.

SUMMARY OF THE INVENTION

One object of the present invention is, therefore, to provide a method and apparatus for efficiently determining which telephony features are assigned to a telephone.

Another object of the present invention is to provide a method and apparatus for generating a list of telephony features assigned to a telephone and for displaying the list to a user of the telephone.

Still another object of the present invention is to provide a method and apparatus for generating a list of telephony features assigned to a telephone that is connected to a public switch which utilizes a protocol that does not provide for automatically downloading class of service information to telephones.

Yet another object of the present invention is to provide a method and apparatus that enable users of telephones connected to public switches which utilize the NI1 or ETSI protocols to display a list of telephony features assigned to their telephones.

A further object of the present invention is to provide a method and apparatus for storing a list of features assigned to a telephone that is connected to a public switch utilizing a protocol that does not provide for downloading class of service information to telephones.

Yet a further object of the present invention is to provide a method and apparatus permitting users of a telephone connected to a public switch utilizing the NI1 or ETSI protocols to efficiently activate selected telephony features.

These and other objects of the present invention will become apparent to those skilled in the art from the following detailed description, the accompanying drawings, and the appended claims.

The present invention encompasses method and apparatus used to determine which telephony features are assigned to a telephone. The present invention preferably is used with a telephone within a network having a central switch system and a plurality of available telephony features.

Embodiments of an apparatus according to the present invention include feature activation means for sending one or more feature activation request signals to the central switch system, each feature activation request signal designating a specific telephony feature; a receiver for receiving feature status signals from the central switch system, each feature status signal indicating whether a feature is assigned to the telephone; and a processor for generating a list of features assigned to the telephone from the feature status signals returned from the central switch system.

Embodiments of a method according to the present invention include the steps of placing a telephone call from the telephone to a predetermined telephone number through the central switch system; sending feature activation request signals to the switch system, each feature activation request signal designating a telephony feature; receiving feature status signals from the switch system, the feature status signals indicating whether a telephony feature is assigned to the telephone; generating a list of features assigned to the telephone from the feature status signals received from the switch system; and displaying the list of features to users of the telephone.

BRIEF DESCRIPTION OF THE DRAWINGS

A complete understanding of the present invention may be gained by considering the following detailed description in conjunction with the accompanying drawing, in which.

DETAILED DESCRIPTION

In a preferred embodiment, the present invention encompasses method and apparatus permitting a user of a telephone connected to a public switch to obtain a list of telephony features assigned to the telephone. To obtain such a list, the user simply places a test call to a predetermined telephone number through the central switch and presses a specified key or sequence of keys. The telephone then communicates with the switch according to a program stored in the telephone, and generates a list of features available to the telephone based on information obtained from the switch. The list of features is then stored in a nonvolatile memory in the telephone, and the user can access and display the list at any time. The present invention is particularly useful for generating a list of features assigned to a telephone where the well-known NI1 or ETSI protocols are used.

Figure 1:
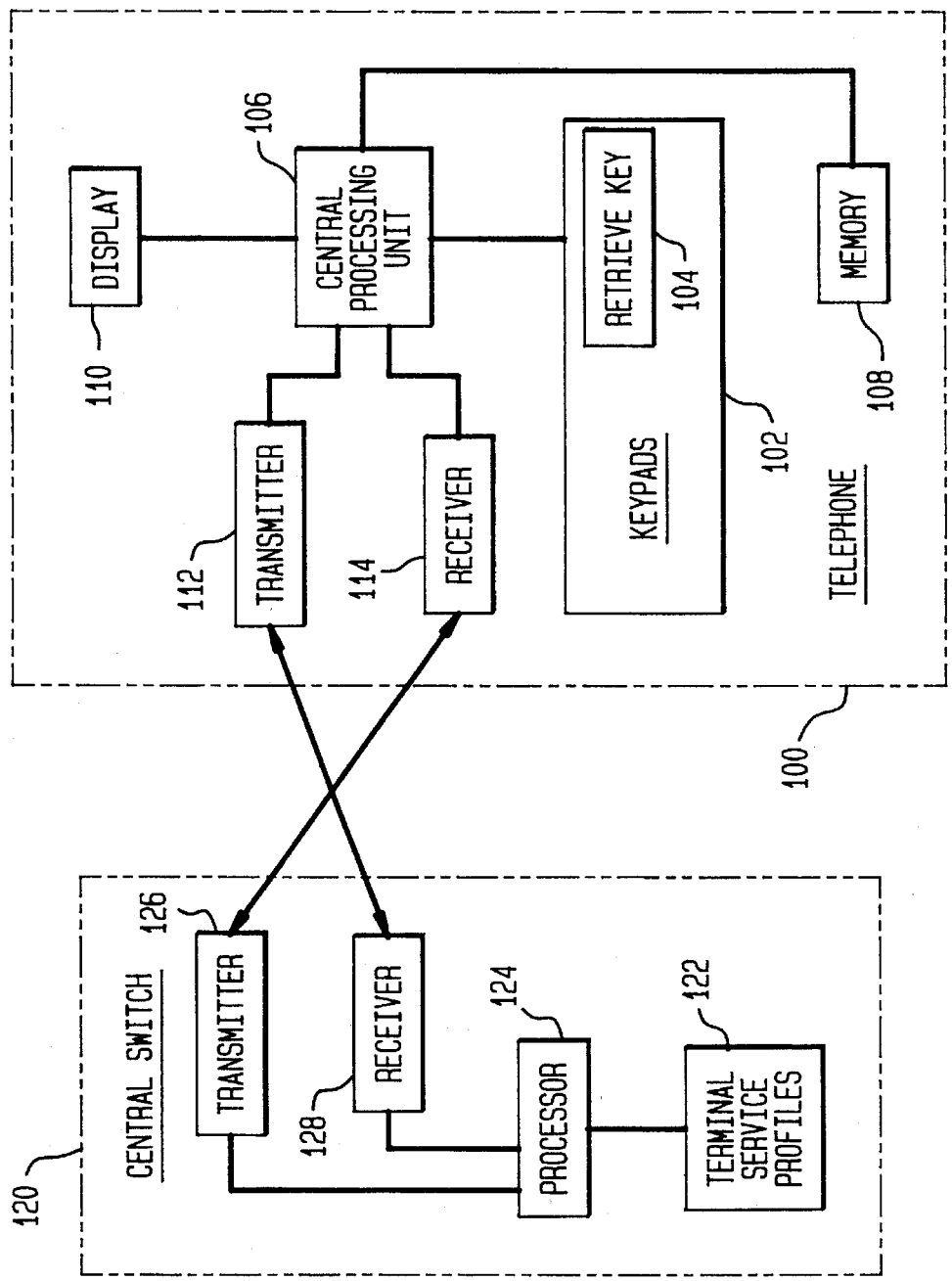
FIG. 1 is a block diagram of a telephony system utilizing the present invention.

A telephony system utilizing an embodiment of the present invention is shown in FIG. 1. FIG. 1 shows a telephone 100 and a central switch 120 of a telephone network. A variety of conventional telephony features are available to telephones utilizing switch 120. The remaining telephones (or terminals) within the telephone network comprising telephone 100 and central switch 120 are not shown for the sake of clarity of the drawing.

Telephone 100 includes keypads 102, a features retrieve key 104, a central processing unit 106, a memory 108, a display 110, a transmitter 112, and a receiver 114. Telephone 100 is physically fabricated in accordance with methods well-known to tho of ordinary skill in the art. In addition to features retrieve key 104, keypads 102 preferably include conventional numeric keypads, function keypads and SCROLL-UP and SCROLL-DOWN function keypads, all of which are well-known in the art and are not separately shown for the sake of clarity of the drawing.

Central switch 120 is a conventional switch that includes terminal service profiles 122 associated with the telephone number of each telephone within the telephone network utilizing the switch. Terminal service profiles 122 include information relating to the special features, such as hold, that are assigned to each telephone within the network, including telephone 100. Switch 120 also includes a processor 124, a transmitter 126, and a receiver 128.

In accordance with the present invention, to determine which telephony features are assigned to telephone 100, a user of telephone 100 places a test call to a predetermined telephone number, referred to herein as a test call telephone number, through central switch 120. The test call telephone number may, for example, be a toll-free telephone number identified in the instruction manual for telephone 100. When the telephone call has been placed, a conventional connection is established between telephone 100 and the terminal corresponding to the test call telephone number. Communication between telephone 100 and switch 120 during the test call is accomplished by means of transmitters 112 and 126 and receivers 114 and 128.

The user then presses features retrieve key 104. In response, as explained further below, central processing trait 106 executes a program stored in a memory within telephone 100, such as memory 108, and generates a list of telephony features available to telephone 100 by communicating with switch 120 in accordance with the program. More specifically, central processing unit 106 causes transmitter 112 to send feature activation request signals corresponding to every possible telephony feature to switch 120. Each feature activation request signal includes a feature activation code designating a specific telephony feature and directing the central switch to activate the designated telephony feature. The specific feature activation codes used preferably are the conventional codes used to activate specific telephony features in a given network, and are determined by the particular protocol used for communication with the central switch. A variety of conventional protocols are well-known to those of ordinary skill in the art.

Based on the terminal service profile associated with telephone 100, switch 120 sends responses to each feature activation request signal to receiver 114 indicating, where appropriate, that a feature has been activated. Central processing unit 106 records a list of the features that have been activated and, thus, are available to the telephone. The features are then deactivated and codes designating the available features (i.e., the features that were activated) are stored in memory 108, which is preferably a nonvolatile memory. The list of features is also displayed to the user on display 110. The set of available responses to feature activation request signals, which responses are also referred to herein as feature status signals, are determined by the protocol used by the central switch. Examples of the use of the present invention with specific, conventional protocols are discussed further herein.

In a preferred embodiment, the list of features remains displayed on display 110 during each active telephone call. Thus, after the initial test call, there is no need for the user to place any additional calls to the telephone company in order to retrieve the list of available features. In alternative embodiments, the list may be displayed at the option of the user. In such alternative embodiments, to display the list of available features at any later time, a user of telephone 100 simply presses a predetermined retrieve key without placing a test call to the central switch. Any key may be used for this purpose. If retrieve key 104 is used, central processing unit must determine in a conventional manner that no test call is in progress to the test call telephone number. If no test call is in progress at the time retrieve key 104 is pressed, central processing unit 106 retrieves the list of features from memory 108.

In many conventional telephones, display 110 is a two-line display. In such cases, the list of available features may be displayed by scrolling through the list using conventional SCROLL-UP and SCROLL-DOWN function keys. Preferably, the list includes only the features actually available to telephone 100. Alternatively, the list may include all possible features with the available features distinguished by highlighting in some conventional manner (e.g., brighter or darker letters).

Preferably, the user may activate a feature from the list by selecting the feature when it is displayed. The selection function may be implemented in any conventional manner. Preferably, the user selects and activates a feature by pressing a predetermined function key when the applicable feature is displayed. For example, the user presses a SCROLL-DOWN function key to scroll through the list of features. When the desired feature is displayed, the user presses a separate predetermined key, a select key, to activate that feature.

In addition to being useful upon installation of telephones, the present invention may also be used to obtain a new list of features when there has been a change in the class of service for a telephone. This is accomplished by again placing a call to the test call telephone number and pressing retrieve key 104 during an active test call. Since a test call is in progress when retrieve key 104 is pressed, central processing unit 106 executes the above-described procedure to generate a new list of telephony features assigned to telephone 100.

Figure 2:
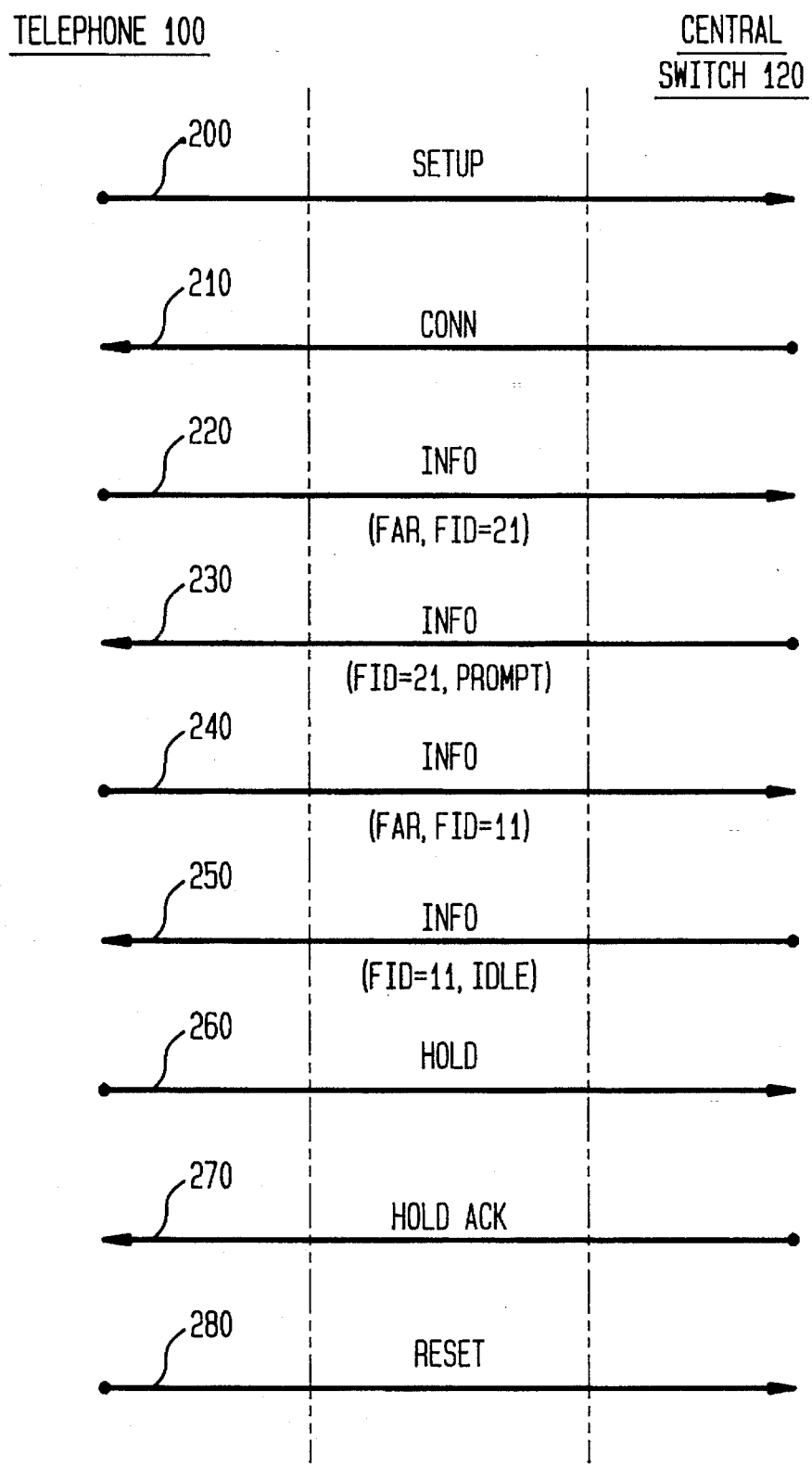
FIG. 2 is a diagram showing an exemplary series of communications between a telephone and a switch in accordance with an embodiment of the present invention.

As a specific example of an embodiment of the present invention, telephone 100 may be a digital telephone and central switch 120 may be a public switch utilizing the well-known NI1 protocol. Telephone 100 is assigned a particular class of service, so that a specific set of features is assigned to the telephone. FIG. 2 shows an exemplary series of communications between these embodiments of telephone 100 and switch 120 in accordance with the present invention. The specific messages shown in FIG. 2 are well-known types of messages used in the NI1 protocol.

To illustrate the operation of this embodiment, consider a user who has purchased telephone 100 and wishes to determine which of the many available telephony features he may actually use. Following the directions in his instruction manual, the user dials a designated test call telephone number through switch 120. As shown at line 200 in FIG. 2, telephone 100 originates the test call by sending a setup signal SETUP to the switch. As shown at line 210, the switch returns a connection signal CONN confirming that a connection has been established.

The user then presses features retrieve key 104, which causes transmitter 112 to send INFO messages containing feature activation codes for each feature to receiver 128 of switch 120, as illustrated at lines 220 and 240 of FIG. 2. As shown, each feature activation code contains a conventional NI1 feature activation request (shown in FIG. 2 as "FAR") and a feature identification number (shown in FIG. 2 as "FID") identifying a specific telephony feature for purposes of the NI1 protocol. For example, the INFO message at line 220 requests activation of the transfer feature, identified by feature identification number 21. Similarly, the INFO message at line 240 requests activation of the conference feature, identified by feature identification number 11. As illustrated at lines 230 and 250, switch 120 responds to each INFO message sent by telephone 100.

In the NI1 protocol, approximately 16,383 codes are available to designate telephony features, but most of such codes are not currently used to designate telephony features that are currently defined and available using the protocol. The defined telephony features and corresponding feature activation codes are well-known to those skilled in the art. The steps illustrated by lines 220, 230, 240 and 250 preferably are performed for each defined telephony feature. For the sake of clarity of the drawing, FIG. 2 shows only two feature activation codes being sent to switch 120.

Processor 124 of switch 120 compares each feature activation code received with the terminal service profile for telephone 100 and thereafter causes transmitter 126 to send appropriate responses corresponding to each feature activation code to telephone 100, as illustrated at lines 230 and 250 of FIG.2. In accordance with the NI1 protocol, switch 120 responds to each feature activation code with the relevant feature identification number and one of the following signals: IDLE, ACTIVE, or PROMPT. An IDLE signal indicates that the relevant requested feature is not assigned to the requesting telephone. An ACTIVE signal indicates that the requested feature has been activated. A PROMPT signal indicates that more information is necessary to activate the relevant requested feature. For example, if the telephone has sent an activation code indicating that a telephone call should be forwarded to a different telephone number, a PROMPT signal may indicate the need for the user to input the new telephone number. As shown at line 230, switch 120 responds to the transfer feature activation request sent by telephone 100 with a PROMPT signal that requests the telephone number to which the call should be transferred.

An ACTIVE or PROMPT signal indicates to telephone 100 that the relevant feature is assigned to the telephone. If an IDLE signal is received, the relevant feature is not available. For example, the IDLE signal shown at line 250 indicates that the conference feature is not available to telephone 100. Based on the signals received, central processing unit 106 generates a list of features assigned to telephone 100. The list is stored in memory 108 of telephone 100, which is preferably a nonvolatile memory.

In the NI1 protocol, as in many other conventional protocols, special treatment is given to certain features referred to as "call dependent" or "state dependent" features. Such features are only available when certain conditions exist. For example, a conventional "hold" feature is only available during an active call.

After first checking features that are not call dependent, telephone 100 then checks call dependent features. This is illustrated at lines 260 and 270 of FIG. 2 for the "hold" feature. As shown at line 260, a HOLD signal is sent to switch 120. Switch 120 responds either with a HOLD-ACK signal which indicates that the hold function is available and placing the test call on hold, as shown at line 270, or a HOLD REJ signal indicating that the hold function is not available. Based on the responsive signals received for each call-dependent feature, central processing unit 106 adds each available call-dependent feature to the list of features stored in memory 108. Thus, a complete list of available features is stored in memory 108 and may displayed at a later time as described above.

Finally, as shown at line 280, telephone 100 resets the telephone line in a conventional manner. Switch 120 responds by deactivating all features that were activated during the test procedure in a conventional manner.

Figure 3:
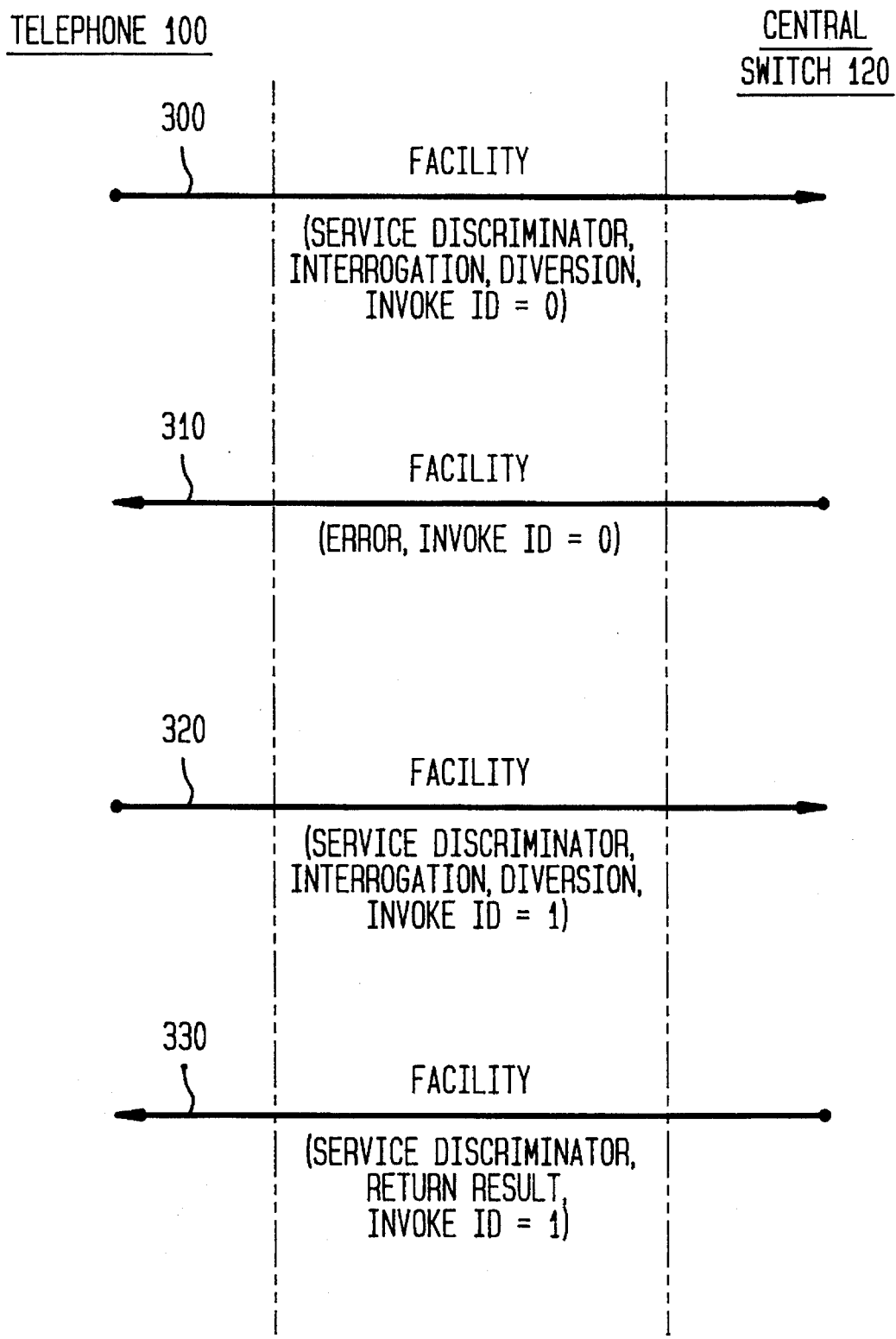
FIG. 3 is a diagram showing an exemplary series of communications between a telephone and a switch in accordance with a second embodiment of the present invention.

FIG. 3 shows an exemplary series of communications between an embodiment of telephone 100 and central switch 120 which, in this case, utilize the well-known ETSI ISDN protocol. As in the case of the NI1 protocol, to determine which telephony features are available in this embodiment, the user places a telephone call to a predetermined telephone number through switch 120 and, after a connection is established in a conventional manner, presses retrieve key 104. The step of establishing a telephone connection is conventional and is not shown in FIG. 3.

As shown at line 300 in FIG. 3, telephone 100 sends a FACILITY message to switch 120. The FACILITY message includes a service discriminator code identifying a specific telephony feature such as call forwarding and an Interrogation Diversion command which, in the ETSI protocol, requests that the identified telephony feature be activated.

In addition, the FACILITY message includes an Invoke ID code which identifies the message itself as a specific transaction. The Invoke ID code enables the responses sent by switch 120 to be correlated with specific FACILITY messages sent by telephone 100. As explained further below, this is accomplished by including the applicable Invoke ID in the responsive message. Since responses may be correlated with specific messages by Invoke ID number, responses need not immediately follow the messages to which they are responsive.

As shown at line 310, of FIG. 3, switch 120 responds to the FACILITY message sent by telephone 100 with a FACILITY message including the same Invoke ID sent in line 300. In addition, the responsive FACILITY message includes either an Interrogation Diversion code indicating the feature has been activated or an error code indicating the feature is not available. Lines 300 and 310 illustrate FACILITY in which an error value is returned, indicating the relevant feature is not available. This information is stored in a nonvolatile memory.

Communications such as those described in connection with lines 300 and 310 are repeated for each feature available to telephones in the network. Because of the Invoke ID codes, responses need not immediately follow requests. Thus, in some embodiments, telephone 100 sequentially sends FACILITY messages corresponding to each available telephone feature and, thereafter, switch 120 responds to each of the FACILITY messages sent by telephone 100.

Lines 320 and 330 illustrate FACILITY messages in which a result is returned, indicating that the relevant feature is available. This information is stored in a nonvolatile memory. After all possible features have been checked, the line is reset in a conventional manner.

After the above-described steps are repeated for each available telephony feature, a complete list of the available features will have been stored in memory. This list can be retrieved and displayed to the user at any time.

In telephone networks in Europe, standard values are generally assigned to each type of telephony feature. This makes it possible to program telephones so that they can obtain a list of features no matter what central switch such telephones are using. If telephones are sold in markets where different codes are used to designate particular telephony features, it will be recognized that the telephones must be programmed with the codes appropriate to the relevant markets.

It will be appreciated by those skilled in the art that further embodiments of the present invention may be made without departing from the teachings of the present invention as described herein. Such embodiments are intended to be within the scope of the appended claims.

For example, in the above-described embodiments, the features retrieve function is initiated by pressing a single retrieve key on the telephone. Alternatively, the retrieve procedure may be initiated by pressing a predetermined sequence of keys on a conventional digital telephone key pad, or by selecting an entry from a menu-style display in a conventional manner. Alternatively, the retrieve function may be automatically performed when the telephone is installed. In such cases, the telephone number used for test calls is preprogrammed into the telephone and dialed automatically upon installation at the telephone. Thus, there is no need for the user to place a test call through the central switch.

Additionally, it will be appreciated by those skilled in the art that the present invention may be used to generate a list of features associated with data communication that are assigned to a telephone as well as to generate a list of assigned features associated with voice communication.

It will be recognized that, for purposes of the present invention, telephones need not be physically "connected" to the central switch. The present invention is useful with telephones that communicate in any manner through a central switch, including cellular telephones.

It will be understood that central processing unit 106 and transmitter 112 serve as one type of feature activation means for sending a set of feature activation request signals to central switch 120, and that other types of feature activation means exist and are intended to be within the scope of the present invention. For purposes of the present invention, the feature activation means may be any signal generator that, in response to a command from the user, sends a set of feature activation request signals to the central switch.

What is claimed is:

1. Apparatus for determining which telephony features are assigned to a telephone within a telephone network having a central switch and a plurality of available telephony features, said apparatus comprising:

feature activation means for sending a plurality of feature activation request signals from the telephone to the central switch, each of said feature activation request signals designating a telephony feature;

a receiver for receiving feature status signals from the central switch, each of said feature status signals indicating whether a feature corresponding to a feature activation signal sent by said feature activation means is assigned to the telephone; and a processor for generating a list of features assigned to the telephone from said feature status signals received from the central switch.

2. The apparatus of claim 1, further comprising a memory for storing said list of features assigned to the telephone.

3. The apparatus of claim 2, wherein said memory is a nonvolatile memory.

4. The apparatus of claim 1, further comprising a display for displaying said list of features assigned to the telephone.

5. The apparatus of claim 4, further comprising a memory for storing said list of features assigned to the telephone, wherein said processor comprises means for retrieving said list of features from said memory and for causing said list to be displayed on said display.

6. The apparatus of claim 4, further comprising means for selecting features from said list of features displayed by said display and means for activating selected features.

7. The apparatus of claim 1, wherein the telephone and the central switch communicate using the NI1 protocol.

8. The apparatus of claim 1, wherein the telephone and the central switch communicate using the ETSI protocol.

9. A telephone, comprising:

means for establishing a telephone connection with a predetermined telephone number through a central switch;

feature activation means for sending a plurality of feature activation request signals to the central switch, said feature activation request signals designating telephone features to be activated;

a receiver for receiving feature status signals from the central switch, said feature status signals indicating whether said telephony features are assigned to the telephone; and a processor for generating a list of features assigned to the telephone from said feature status signals.

10. The telephone of claim 9, further comprising a memory for storing said list of features assigned to the telephone.

11. The telephone of claim 9, further comprising a display for displaying said list of features assigned to the telephone.

12. A method for determining which telephony features are assigned to a telephone within a telephone network having a central switch and a plurality of available telephony features, the telephone having a display, said method comprising the steps of:

placing a telephone call from the telephone to a predetermined telephone number through the central switch;

sending a plurality of feature activation request signals to the central switch, each of said feature activation request signals designating a telephone feature;

receiving feature status signals corresponding to each of said feature activation request signals from the switch, said feature status signals indicating whether a telephony feature corresponding to each of said feature activation request signals is assigned to the telephone;

generating a list of features assigned to the telephone from said feature status signals received from the switch; and displaying said list of features assigned to the telephone on the display.

13. The method of claim 12, further comprising the step of storing said list of features assigned to the telephone in a memory.

* * * * *